May 24, 1949. W. J. BRETH 2,471,140
FEED TABLE FOR TIRE BUILDING MACHINES
Filed Nov. 13, 1946 2 Sheets-Sheet 1
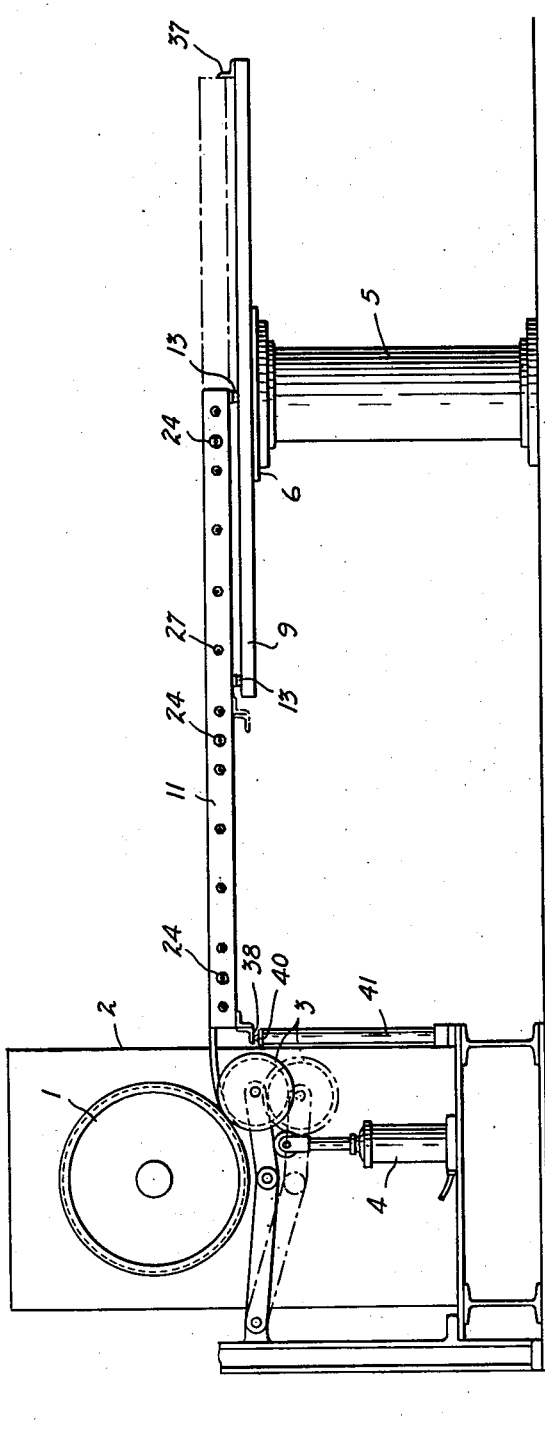
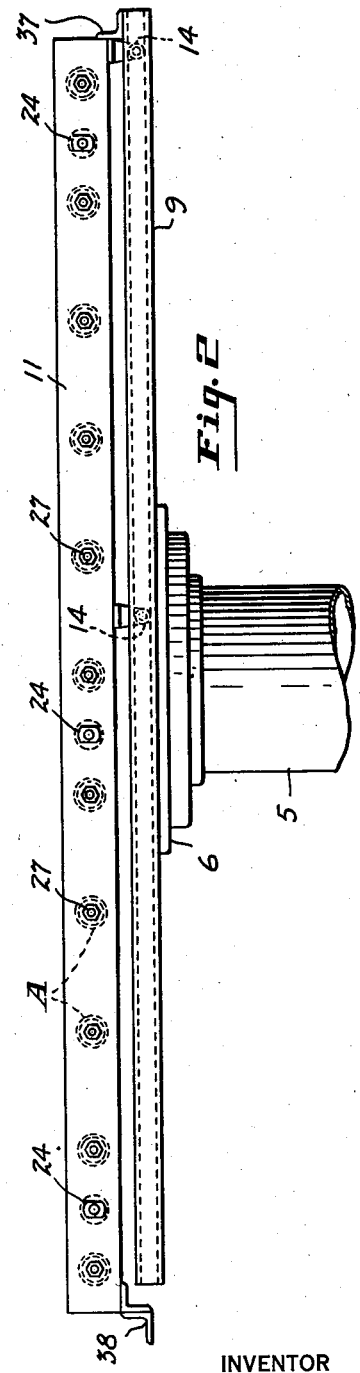
INVENTOR
*Walter J. Breth*
BY
*Evans & McCoy*
ATTORNEYS May 24, 1949.  W. J. BRETH  2,471,140
FEED TABLE FOR TIRE BUILDING MACHINES
Filed Nov. 13, 1946  2 Sheets-Sheet 2
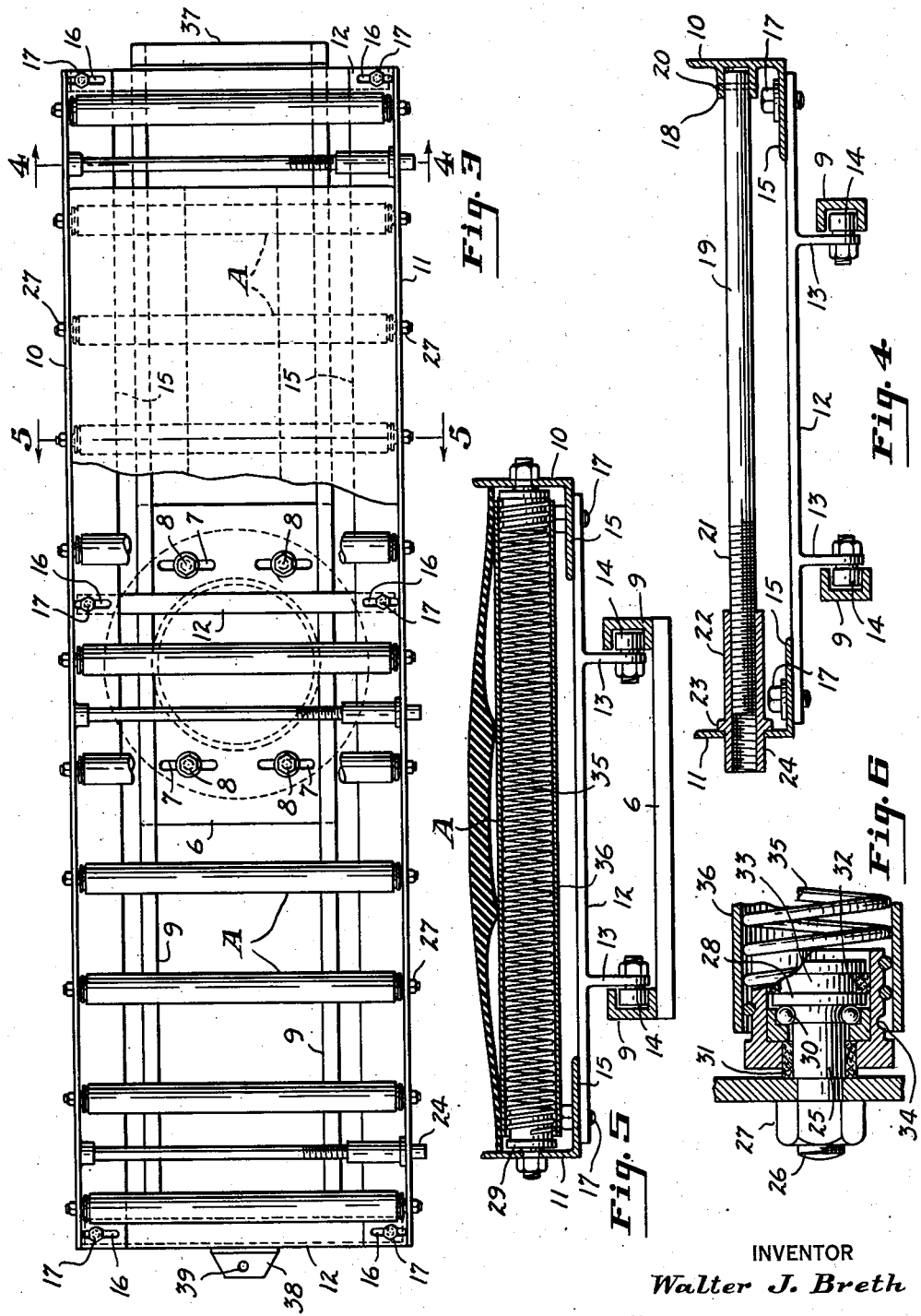
INVENTOR
Walter J. Breth
BY
Evans + McCoy
ATTORNEYS Patented May 24, 1949

2,471,140

UNITED STATES PATENT OFFICE 2,471,140

FEED TABLE FOR TIRE BUILDING MACHINES

Walter J. Breth, Akron, Ohio, assignor to The General Tire and Rubber Company, Akron, Ohio, a corporation of Ohio Application November 13, 1946, Serial No. 709,609

4 Claims. (Cl. 193—35)

1

This invention relates to a feed device for delivering strip material to a tire building drum, and more particularly to a device for delivering tread stock to a tire building drum.

The invention has for its object to provide a feed conveyor of simple, inexpensive and rugged construction that is readily adjustable from a feeding position at the front of a tire building drum, to an inoperative position in which it is spaced away from the tire building drum far enough to permit an operator to work in front of the drum.

An additional object of the invention is to provide a tread stock conveyor of simple and compact construction that is adjustable to accommodate various widths of tread stock and which is bodily adjustable to enable it to be properly alined with the drum.

With the above and other objects in view, the invention may be said to comprise the feed device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation showing the conveyor of the present invention positioned to deliver tread stock to a tire building drum;

Fig. 2 is a fragmentary side elevation showing the conveyor in retracted position on a scale somewhat larger than that of Fig. 1;

Fig. 3 is a top plan view of the conveyor;

Fig. 4 is a section taken on the line indicated at 4—4 in Fig. 3;

Fig. 5 is a section taken on the line indicated at 5—5 in Fig. 3, and

Fig. 6 is a fragmentary axial section on an enlarged scale through one end of a stock supporting roll.

As illustrated in the accompanying drawings, the feed device of the present invention is in the form of a roller conveyor A that is mounted in front of a tire building drum I to deliver tread stock to the drum. The drum I is carried by a suitable frame 2 and provided with a roller 3 that is adapted to be pressed against the drum by means of a fluid pressure cylinder 4, the roller 3 serving to press tread stock against previously applied fabric on the drum. Spaced a substantial distance in front of the drum I there is a stand 5 in the form of a pedestal, to the top of

2 which there is attached a horizontal plate 6, the plate 6 being provided with transverse slots 7 which receive bolts 8 which attach the plate to the pedestal, the slots 7 permitting the lateral adjustment of the plate 6 on the pedestal. The plate 6 provides a support for two elongated parallel guide rails 9 which project beyond the ends of the plate 6 and which are disposed at right angles to the drum I. The rails 9 provide a track for the roller conveyor A which has an elongated frame composed of longitudinal side bars 10 and 11 and spaced cross bars 12. The cross bars 12 have depending arms 13 which carry rollers 14 which travel in the inwardly facing channels of the rails 9. The longitudinal side bars 10 and 11 have horizontal flanges 15 that are provided with transverse slots 16 to receive bolts 17 by means of which the side bars are adjustably connected to the cross bars 12. The side bar 11 is provided at longitudinally spaced points with sockets 18 on the inner side thereof, each of which receives one end of a rod 19 that is attached to the socket by suitable means such as a transverse pin 20. At its opposite end each of the rods 19 has a threaded portion 21 that screws into a tubular nut 22 that is provided with a shoulder 23 engaging the inner face of the side bar 11 and with a wrench receiving portion 24 that projects through an opening in the side bar 11. By turning the nut 22 an outward thrust may be exerted upon the side bars 10 and 11 to spread them apart.

The side bars 10 and 11 serve to support the longitudinally spaced transversely disposed conveyor rollers A which form a supporting bed for the thread stock. Each roller is supported at its ends on stub shafts 25 that are attached to the side bars 10 and 11. The stub shafts are of identical construction and one of them is illustrated in Fig. 6. As shown in Fig. 6, the shaft 25 has a reduced end 26 which extends through the side bar and is rigidly clamped to the side bar by means of a nut 27. The stub shaft has an enlarged inner end 28 and provides a support for a collar 29 which is rotatably supported on the shaft by means of a ball bearing 30 which engages the shaft outwardly of the enlarged inner end 28.

An oil sealing ring 31 is interposed between the outer end of the collar 29 and the shaft 25 and an inner oil sealing ring 32 is interposed between the inner end portion of the collar 29 and the enlarged inner end 28 of the shaft, the enlarged portion 28 of the shaft being provided with a groove 33 in which the sealing ring 32 is seated. Each of the collars 29 is provided with an external spiral groove 34 to receive an end of a coil spring 35, each pair of axially alined collars 29 being connected by a spring 35. A sleeve 36 forming the body of the supporting roller fits externally upon the spring 35 and telescopically receives the collars 29 in its opposite ends so as to hold the end portions of the spring 35 in the grooves 34. The springs are under tension so that they tend to pull the side bars 10 and 11 together so that when the bolts 17 are loosened the side bar 11 will be pressed by the springs 35 against the stop shoulders 23 of the nuts 22. When the nuts 22 are turned by means of a wrench engaging the projecting end 24 the side bars 10 and 11 may be spread further apart to increase the tension of the spring 35, or the nuts 22 may be moved inwardly on the rods 19 to permit the spring 35 to draw the side bars 10 and 11 closer together. The telescopic connection between the sleeves 36 and the supporting collars 29 permits the side bars 10 and 11 to have a substantial range of lateral adjustment to accommodate tread stocks of different widths for different sizes of tires. After an adjustment of the width of the conveyor, the conveyor may be adjusted laterally by means of the bolts 8 and slots 7 if necessary to properly aline the conveyor with the tire building drum 1.

The rails 9 carry a stop bar 37 which limits the movement of the conveyor away from the drum, the longitudinal movement of the conveyor being sufficient to provide a space between the inner end of the conveyor and the drum 1 sufficient to enable the operator to stand in front of the drum to perform tire building operations other than the application of the tread stock. At its forward end the conveyor frame carries a latch plate 38 provided with an aperture 39 that is adapted to engage with a pin 40 at the upper end of a standard 41 carried by the frame 2 of the tire building machine. The conveyor frame has sufficient play in the guide rails 9 to permit the forward end thereof to be lifted sufficiently to disengage the latch plate 38 from the pin 40 when it is desired to retract the conveyor.

It is to be understood that variations and modifications of the specific device herein shown and described for purposes of illustration, may be made without departing from the spirit of the invention.

What I claim is:

1. A feed device of the character described comprising a pair of longitudinal side bars, transverse spacing members connecting said bars and adjustable to spread the bars apart or move the same closer together, and spaced extensible transverse stock supporting rollers between said bars, each roller comprising axially alined end members rotatably mounted on said side bars, and a sleeve telescopically receiving said end members.

2. A feed device of the character described comprising a pair of longitudinal side bars, adjustable transverse spacing members connecting said bars, and spaced transverse stock supporting rollers between said bars, each roller comprising axially alined end members rotatably mounted on said side bars, a coil spring connected at its ends to said end members, and a sleeve fitting on said spring.

3. A feed device of the character described comprising a pair of longitudinal side members, spaced transverse stock supporting rollers mounted between said bars, each roller comprising end members rotatably mounted on said bars, a coil spring connected at its ends to said members and under tension, a sleeve enclosing the spring and telescopically receiving said end members, and means for exerting an outward thrust on said side bars to spread the same in opposition to said springs.

4. A feed device of the character described comprising a pair of longitudinal side bars, spacing members connecting said bars, axially alined pairs of stub shafts carried by said bars, collars rotatably mounted on said shafts, means holding said collars against axial movements on said shafts, a coil spring attached at its ends to each pair of axially alined collars, a sleeve substantially enclosing each spring, and means for adjusting said spacing members to vary the spacing of said side bars.

WALTER J. BRETH.

REFERENCES CITED

The following references are of record in the file of this patent:

UNITED STATES PATENTS

| Number | Name | Date |
| --- | --- | --- |
| 1,102,072 | Patterson | June 30, 1914 |

FOREIGN PATENTS

| Number | Country | Date |
| --- | --- | --- |
| 248,032 | Germany | June 11, 1912 |